(12) United States Patent
Tamir

(10) Patent No.: US 7,941,971 B2
(45) Date of Patent: May 17, 2011

(54) IRRIGATION SYSTEM

(76) Inventor: Avraham Tamir, Moshav Gan Yoshiya (IL)

( * ) Notice: Subject to any disclaimer, the term of this patent is extended or adjusted under 35 U.S.C. 154(b) by 643 days.

(21) Appl. No.: 11/910,741

(22) PCT Filed: Apr. 6, 2006

(86) PCT No.: PCT/IL2006/000439
§ 371 (c)(1),
(2), (4) Date: Jun. 12, 2008

(87) PCT Pub. No.: WO2006/106518
PCT Pub. Date: Oct. 12, 2006

(65) Prior Publication Data
US 2008/0256857 A1 Oct. 23, 2008

Related U.S. Application Data

(60) Provisional application No. 60/668,593, filed on Apr. 6, 2005.

(51) Int. Cl.
A01G 25/00 (2006.01)
(52) U.S. Cl. ............................ 47/79; 47/48.5
(58) Field of Classification Search ................. 47/48.5, 47/65.6, 79, 33; 210/170.08; 405/39, 51, 405/118–120
See application file for complete search history.

(56) References Cited

U.S. PATENT DOCUMENTS

| 632,795 | A |   | 9/1899 | Stoddart |   |
|---|---|---|---|---|---|
| 840,811 | A | * | 1/1907 | Vestal | 405/36 |
| 3,906,667 | A | * | 9/1975 | Williams | 47/79 |
| 4,887,388 | A |   | 12/1989 | Walter, Jr. |   |
| 5,036,619 | A |   | 8/1991 | Whitcomb |   |
| 5,067,272 | A | * | 11/1991 | Constantz | 47/48.5 |
| 6,692,186 | B1 | * | 2/2004 | Suazo et al. | 405/36 |
| 6,754,989 | B2 | * | 6/2004 | Eicher | 47/32 |
| 7,392,614 | B2 | * | 7/2008 | Kruer et al. | 47/48.5 |
| 2004/0088917 | A1 | * | 5/2004 | Chambers | 47/58.1 SC |

FOREIGN PATENT DOCUMENTS

DE 29808561 10/1998

* cited by examiner

Primary Examiner — Rob Swiatek
Assistant Examiner — Danielle Clerkley
(74) Attorney, Agent, or Firm — Mark M. Friedman

(57) ABSTRACT

Disclosed is an irrigation device for use with a drip irrigation conduit for providing water to individual plants planted in rows. The irrigation device includes a water distribution element configured with at least one support configuration for supporting the drip irrigation conduit, and a plurality of water direction elements. Water emitted by the drip irrigation conduit is collected by said water distribution element and each of said plurality of water direction elements directs said water to a different delivery point that corresponds to the location of a plant. The water distribution element of the present invention is provided in at least three variations. In a first variation, the water distribution element of the present invention is deployed between the crop rows and is configured with at least one water flow trough and a plurality of spaced apart output channels extending from the water flow troughs at predefined intervals (matching the intervals between plants) used to direct water coming from the water flow trough to the individual plants. In a second variation, the water distribution element of the present invention is deployed over the crop row and is configured with a separate opening for each crop plant to which the water is directed. A third variation, of the water distribution element of the present invention is deployed substantially as a groundcover having a plurality of openings to provided growing space for the individual crop plants.

8 Claims, 10 Drawing Sheets

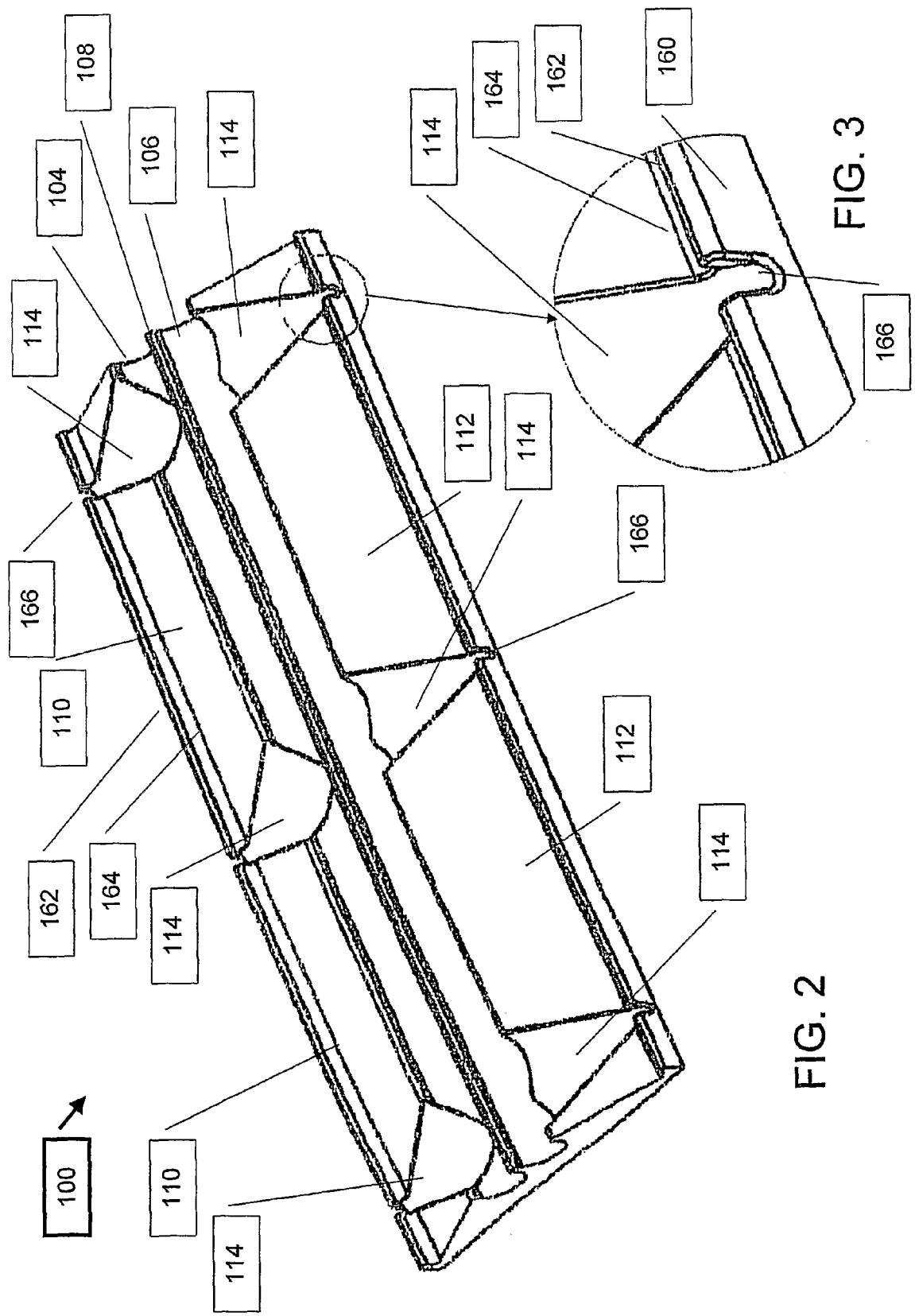

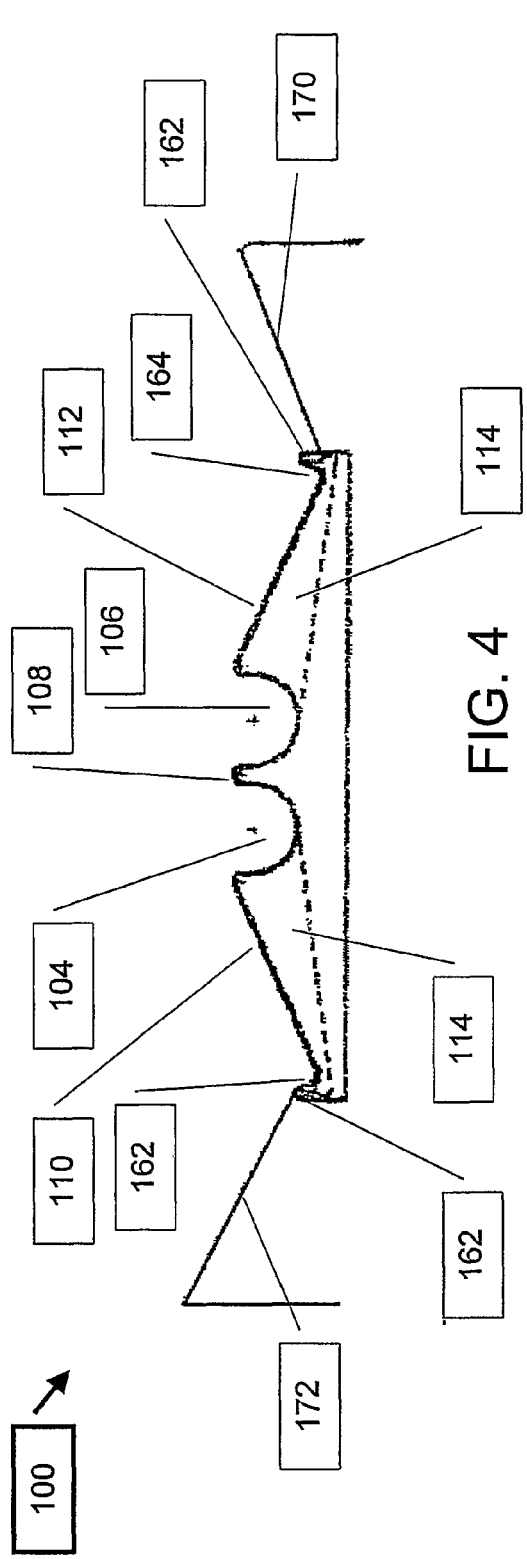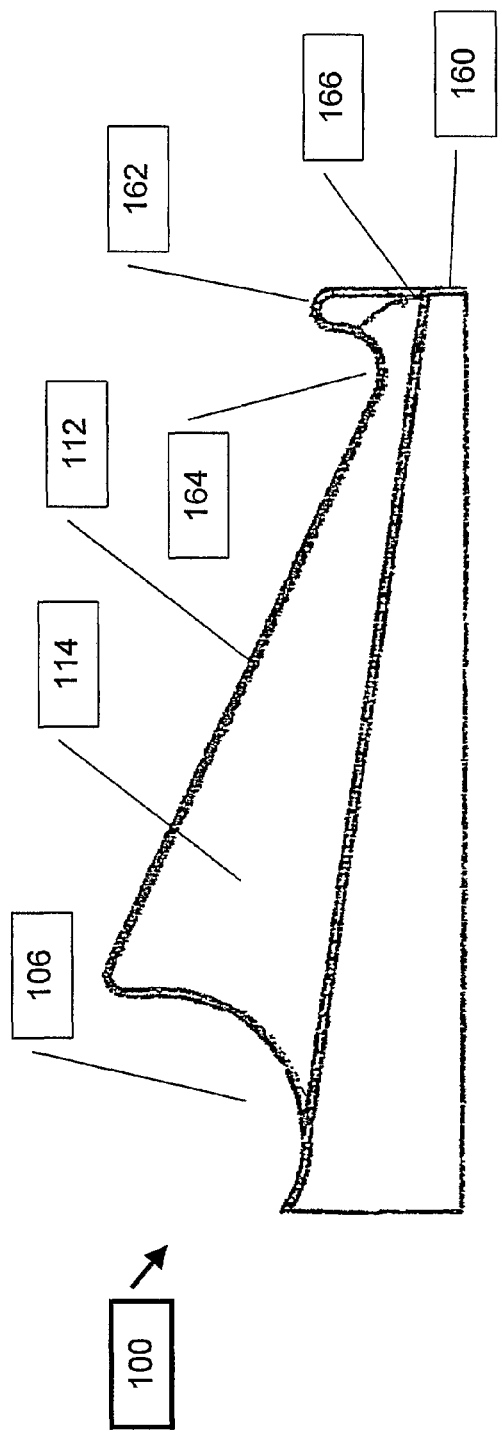

IRRIGATION SYSTEM

FIELD AND BACKGROUND OF THE INVENTION

The present invention relates to field irrigation equipment and, in particular, it concerns a drip irrigation system that provides water substantially only to the plants in the field while reducing the amount of water lost to evaporation.

Irrigation in farming is an important factor in the productivity of a crop. By controlling irrigation, more optimal growing conditions may be created and maintained thereby increasing crop yield for a given amount of land. Irrigation comes at a cost requiring irrigation equipment and water to supply the irrigation equipment. In some parts of the world, water is in short supply so it is advantageous to use available water resources in the most cost effective and conservative manner possible.

Watering soil that does not directly support growth of plants is a waste of water. Other forms of loss include evaporation, which varies depending upon climate, temperature and relative humidity. In arid regions, these losses may be substantial thereby driving up the costs of irrigation and ultimately the cost of food.

Furthermore, in many regions of the world, the amount of coincidental moisture, such as due and rain, that occurs naturally is sufficient for plant growth if properly directed.

There is therefore a need for an irrigation system that provides water substantially only to the crop plants in the field while reducing the amount of water lost to evaporation. If would be of benefit if the irrigation system were to collect and direct coincidental moisture.

SUMMARY OF THE INVENTION

The present invention is an irrigation system that provides water substantially only to the plants in the field while reducing the amount of water lost to evaporation.

According to the teachings of the present invention there is provided, an irrigation device for use with a drip irrigation conduit for providing water to individual plants planted in rows, the irrigation device comprising a water distribution element configured with at least one support configuration for supporting the drip irrigation conduit, and a plurality of water direction elements, wherein water emitted by the drip irrigation conduit is collected by the water distribution element and each of the plurality of water direction elements directs the water to a different delivery point.

According to a further teaching of the present invention, there is also provided a coincidental-moisture collection structure.

According to a further teaching of the present invention, the water distribution element is configured for deployment between the rows of plants.

According to a further teaching of the present invention, the at least one support configuration for supporting the drip irrigation conduit is configured substantially as a water flow trough and the plurality of water direction elements is configured as a plurality of downwardly sloping output channels extending laterally from the water flow trough, and a bottom surface of the water flow trough is configured with a plurality of high points such that one of the plurality of high points is located between each of the plurality of output channels, and the bottom surface of the water flow trough is configured with a plurality of low points, each corresponding to one of the output channels such that any water dispensed into the water flow trough between any two the high points will be directed to one of the low points, and thus one of the output channels, located between the two high points.

According to a further teaching of the present invention, a coincidental-moisture collection structure is configured as at least one downwardly sloping surface extending outwardly from the water flow trough.

According to a further teaching of the present invention, the at least one downwardly sloping surface is configured with a raised lip on a peripheral edge of the downwardly sloping surface.

According to a further teaching of the present invention, the at least one downwardly sloping surface is configured with moisture collection trough configure adjacent to a peripheral edge of the downwardly sloping surface.

According to a further teaching of the present invention, there is also provided at least one upwardly sloping surface extending outwardly from the peripheral edge of the downwardly sloping surface such that moisture collected on the upwardly sloping surface is directed toward the peripheral edge of the downwardly sloping surface.

According to a further teaching of the present invention, the water distribution element is configured for deployment over at least one row of plants.

According to a further teaching of the present invention, the plurality of water direction elements are configured as an interconnected series of downwardly sloping funnels, an aperture of each funnel providing an opening through which one of the plants emerges.

According to a further teaching of the present invention, the water distribution element is configured substantially as a groundcover having a plurality of openings to provide growing space for the individual plants.

According to a further teaching of the present invention, the at least one support configuration for supporting the drip irrigation conduit is configured substantially as a water flow trough and the plurality of water direction elements is configured as a plurality of downwardly sloping output channels extending laterally from the water flow trough, and the groundcover is configured with a plurality of sloping surfaces configured to direct water from the output channels to a plurality of open plant areas configured in the groundcover so as to provide growing space for the individual plants.

According to a further teaching of the present invention, the groundcover is configured with three spaced apart rows of open plant areas, each row separated from an adjacent row by one the water flow trough.

According to a further teaching of the present invention, the groundcover extends beyond outer ones of the three spaced apart rows of open plant areas so as to include an inwardly sloping coincidental-moisture collection surface configured to direct coincidental-moisture toward the open plant areas.

According to a further teaching of the present invention, the water distribution element configured with drip irrigation conduit integrally formed with the water distribution element.

There is also provided according to the teachings of the present invention, an irrigation system comprising: a) a drip irrigation conduit operably connected to a water supply source for controlling a flow of water thorough the drip irrigation conduit; b) a water distribution element configured with at least one support configuration for supporting the drip irrigation conduit, the water distribution element configured to collect water emitted by the drip irrigation conduit; and c) a plurality of water direction elements configured in the water distribution element, such that the water collected by the water distribution element is directed by each of the plurality of water direction elements to a different delivery point, each delivery point being proximal to one of the plants.

There is also provided according to the teachings of the present invention, a method for irrigating field crops planted in rows, the method comprising: a) providing a drip irrigation conduit operably connected to a water supply source for controlling a flow of water thorough the drip irrigation conduit; b) providing a water distribution element configured with at least one support configuration for supporting the drip irrigation conduit, the water distribution element configured to collect water emitted by the drip irrigation conduit; c) providing a plurality of water direction elements configured in the water distribution element, such that the water collected by the water distribution element is directed by the plurality of water direction elements such that each of the plurality of water direction elements provides water to one of a plurality of desired delivery points, and each of the delivery points is proximal to one of the plants; and d) operating the water supply source so as to provide a flow of water through the drip irrigation conduit.

According to a further teaching of the present invention, there is also provided collecting coincidental-moisture and directing the coincidental-moisture toward the desired delivery points.

According to a further teaching of the present invention, there is also provided deploying the water distribution element between the rows.

According to a further teaching of the present invention, there is also provided deploying the water distribution element over the rows.

According to a further teaching of the present invention, the water distribution element is implemented substantially as a groundcover.

BRIEF DESCRIPTION OF THE DRAWINGS

The invention is herein described, by way of example only, with reference to the accompanying drawings, wherein:

FIG. 2 is an isometric view of a second preferred embodiment of a first variation of an irrigation system element constructed and operative according to the teachings of the present invention;

FIG. 3 is a detail of the embodiment of FIG. 2;

FIG. 4 is an end elevation of the embodiment of FIG. 2 that also includes optional coincidental-moisture collection elements constructed and operative according to the teachings of the present invention;

FIG. 5 is a cross-sectional view of half of the width of the embodiment of FIG. 2;

DESCRIPTION OF THE PREFERRED EMBODIMENTS

Figure 1:
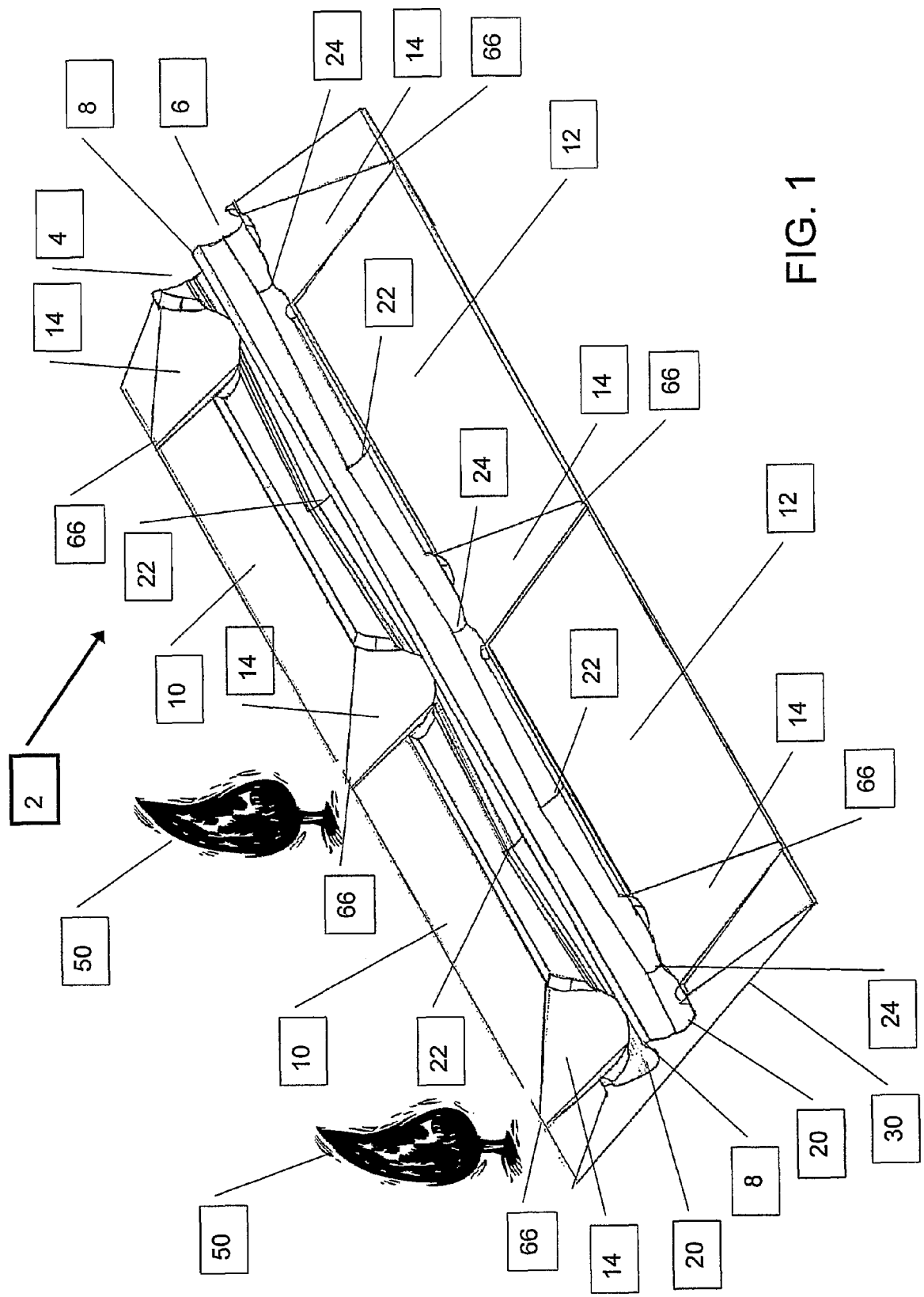
FIG. 1 is an isometric view of a first preferred embodiment of a first variation of an irrigation system element constructed and operative according to the teachings of the present invention.

The present invention is an irrigation system that provides water substantially only to the plants in the field while reducing the amount of water lost to evaporation.

The principles and operation of an irrigation system according to the present invention may be better understood with reference to the drawings and the accompanying description.

By way of introduction, the irrigation system element of the present invention is configured for use in the irrigation of fields, so as to direct the water emitted from a typical drip irrigation conduit, such as a pipe or hose, to areas proximal to individual plants, and thereby use substantially less water than prior art solutions, yet provide the same amount of water to the plants being irrigated. In regions of the world were the amount of coincidental moisture, such as due and rain, that occurs naturally may be sufficient for plant growth if properly directed, therefore the irrigation element of the present invention also provides for the collection and direction of coincidental moisture. During the time of the growing season that the amount of coincidental moisture is sufficient to sustain plant grow, it may not be necessary to provide extra water by through the drip irrigation conduit. This may provide extra savings by reducing the amount of irrigation water that is used. In this sense, the irrigation element of the present invention provides a tremendous advantage over the systems of the prior art.

In the present invention, a device for distributing water throughout a field is presented which includes structural arrangements to deliver the water where it is needed most, that is, to the base of the plant near the plants roots. Preferably, irrigation takes place at night or at other times when the soil may absorb a maximum amount of water and lose the least amount to evaporation. The dripping water exits the irrigation apparatus near the base of a plant. Very little water is lost in this process due to spray, evaporation or in wetting soil that has no plants. A side benefit of such an arrangement is that weeds or other forms of plant life that may damage the soil or reduce nutrients in the soil will find it much more difficult to thrive since no water is made available between the plants being irrigated.

To provide a full irrigation system, the irrigation system element of the present invention is combined with substantially any drip irrigation conduit known in the art and substantially any known water flow control means may be incorporated into the irrigation system of the present invention to facilitate starting and stopping the flow of water through the system. Alternately, the irrigation system element of the present invention may be configured with an integrally formed drip irrigation conduit.

More specifically the irrigation system element of the present invention is provided in at least three variations. In a first variation, described with regard to FIGS. 1-7 and 12, the water distribution element of the present invention is deployed between the crop rows and is configured with at least one water flow trough and a plurality of spaced apart output channels extending from the water flow troughs at predefined intervals (matching the intervals between plants) used to direct water coming from the water flow trough to the individual plants.

Figure 8:
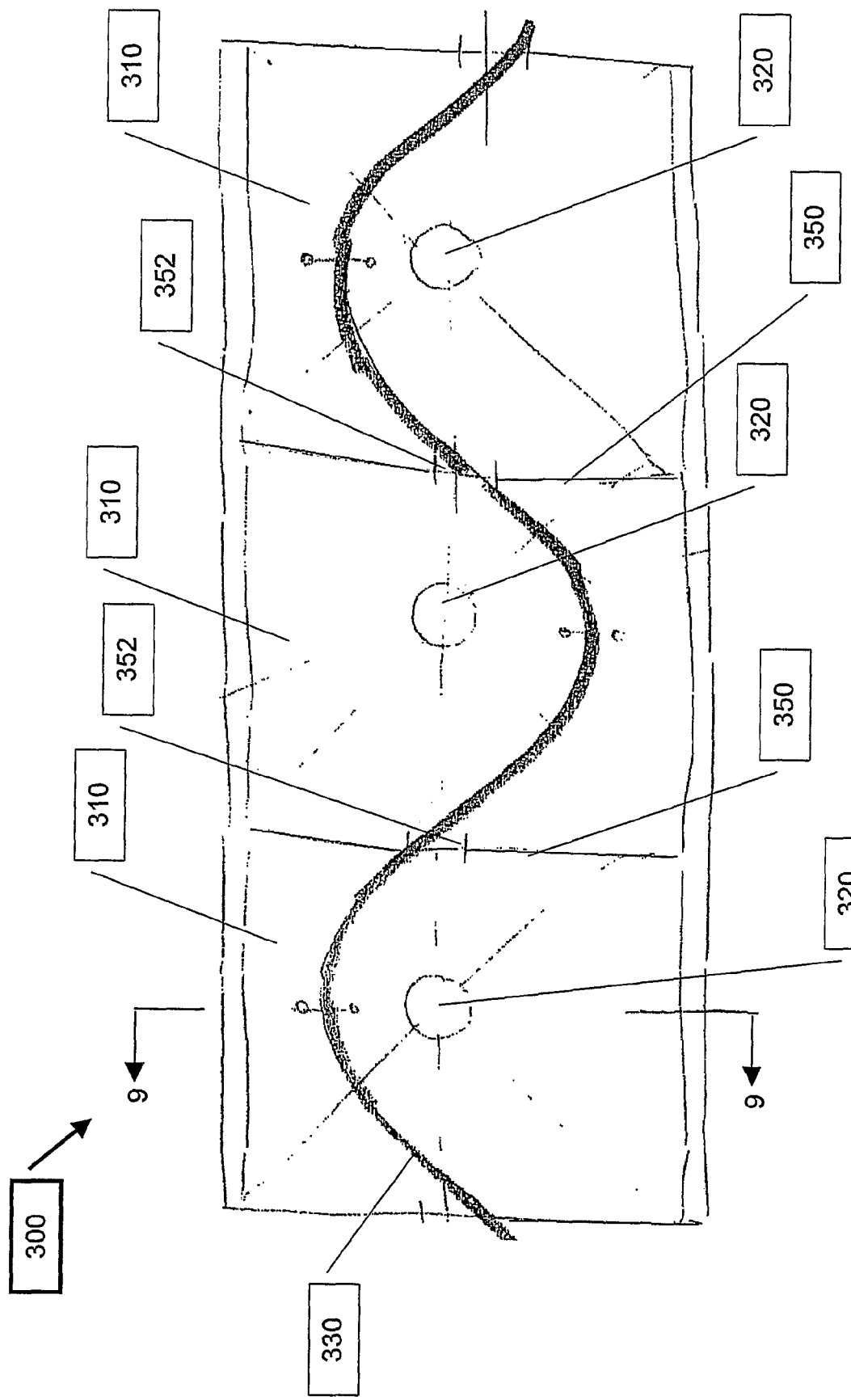
FIG. 8 is a top elevation of a length of a preferred embodiment of a second variation of an irrigation system element constructed and operative according to the teachings of the present invention.
Figure 9:
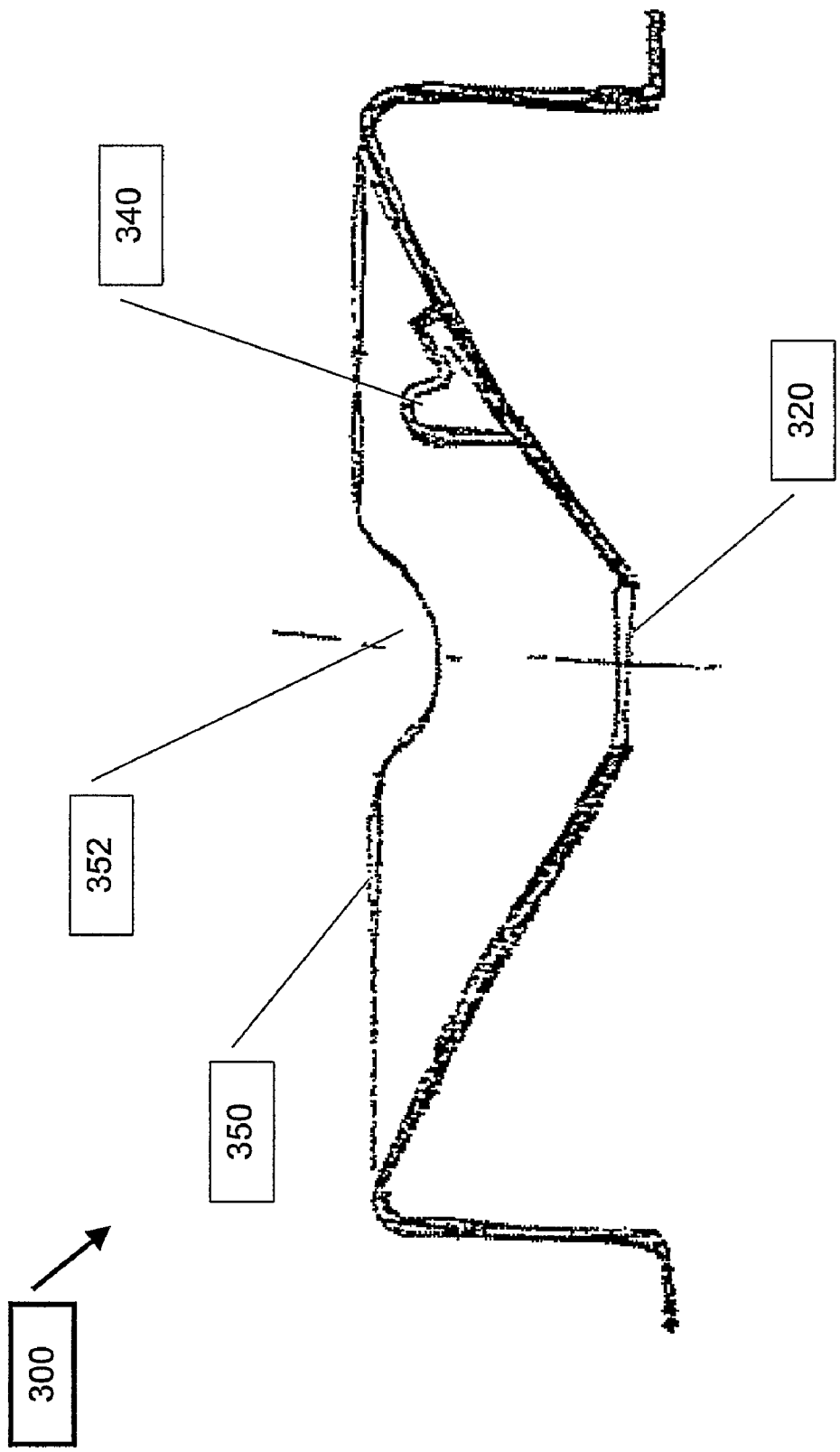
FIG. 9 is a cross-sectional view of the embodiment of FIG. 8 taken along section line 9-9.

In a second variation, described with regard to FIGS. 8 and 9, the water distribution element of the present invention is deployed over the crop row and is configured with a separate opening for each crop plant to which the water is directed.

Figure 10:
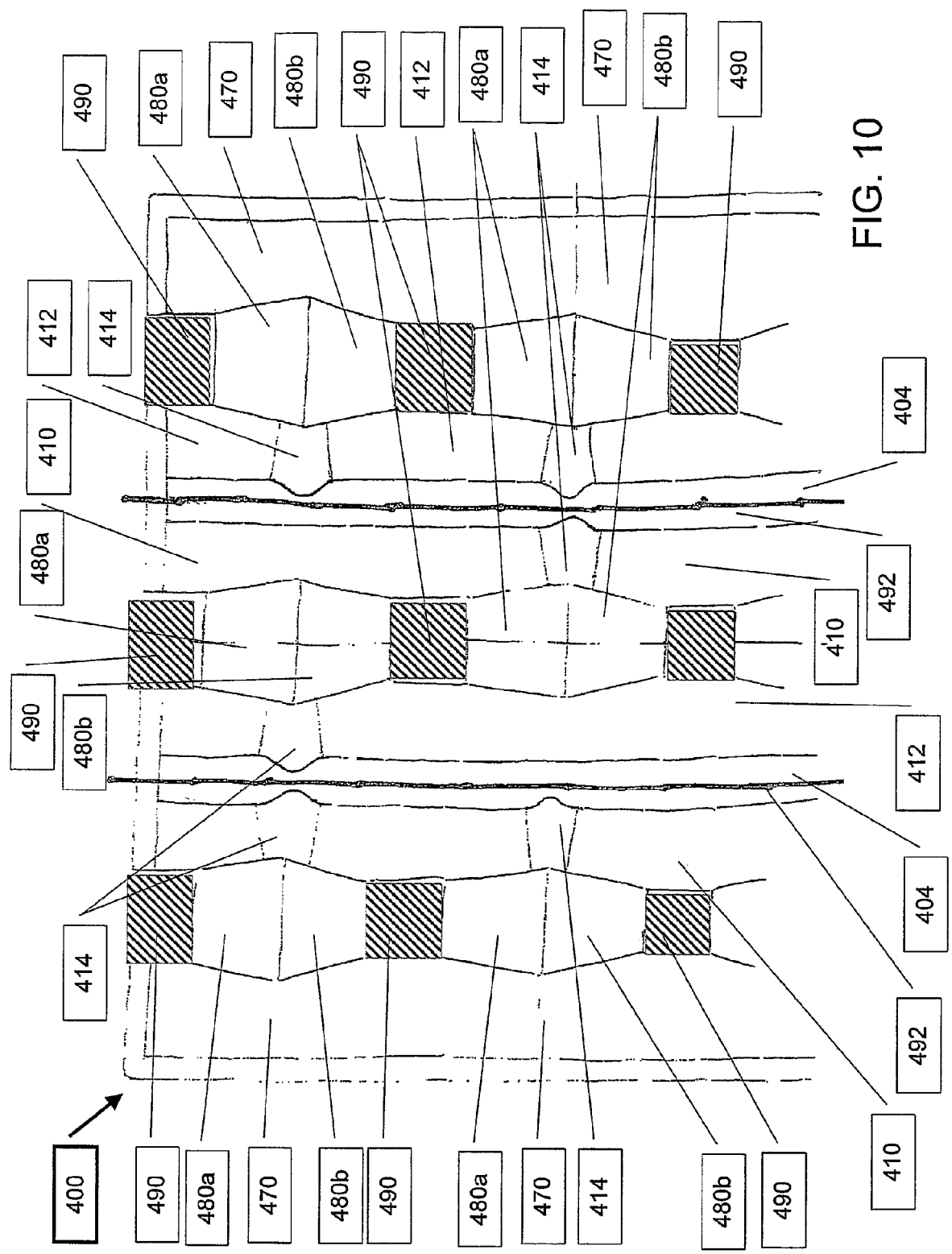
FIG. 10 is a top elevation of a length of a preferred embodiment of a third variation of an irrigation system element constructed and operative according to the teachings of the present invention.
Figure 11:
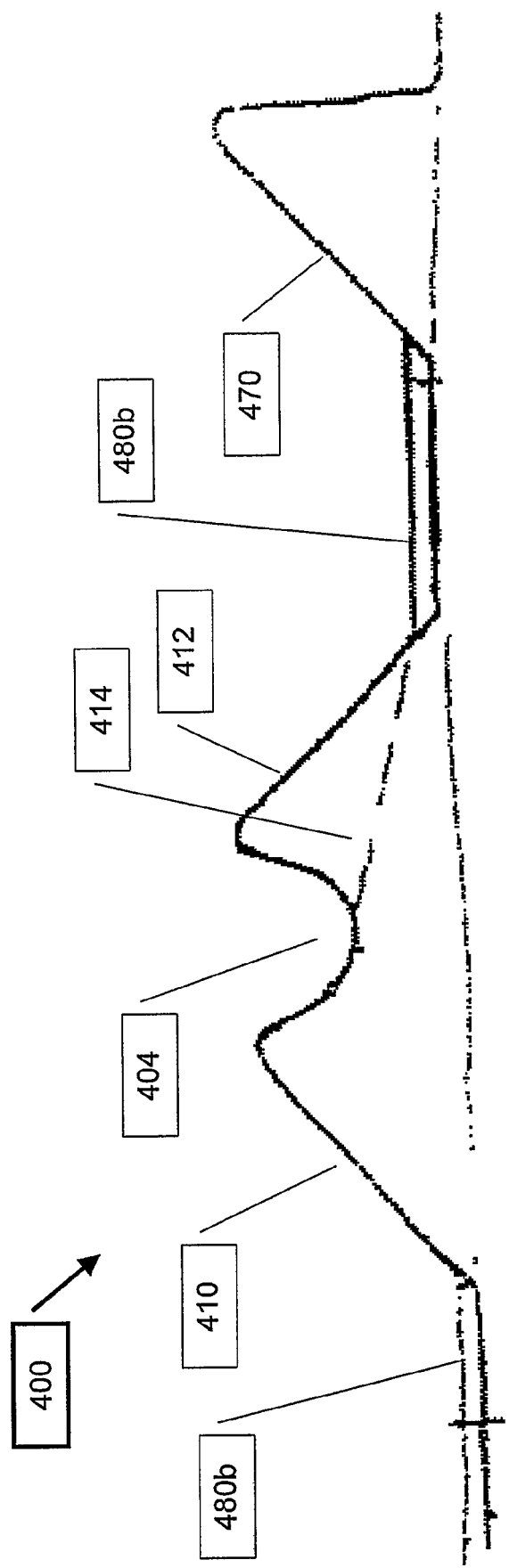
FIG. 11 is a cross-sectional view of the embodiment of FIG. 10 taken along section line 11-11.

A third variation, described with regard to FIGS. 10 and 11, of the water distribution element of the present invention is deployed substantially as a groundcover having a plurality of openings to provide growing space for the individual crop plants.

Referring now to the drawings, FIG. 1 illustrates a first preferred embodiment of the first variation of the irrigation system element of the present invention, generally referred to herein as 2 in which the water distribution element is deployed between the crop rows.

The water distribution element 2 is configured with a substantially flat bottom 30, and a top configured with two parallel water flow troughs 4 and 6 that are separated by a central ridge 8. These water flow troughs 4 and 6, in addition to supporting drip irrigation conduits (not shown) act as water distribution elements. Extending outwardly from the water flow troughs 4 and 6 are downwardly sloping surfaces 10 and 12, into which are configured a number of output channels 14. Each of the output channels is spaced at an interval corresponding to the distance between the plants 50 in the rows on either side of the water distribution element 2 such that the delivery point opening 66 of each of the output channels 14 is located substantially adjacent to a plant 50.

Water is supplied to the system by drip irrigation pipes (not shown) of substantially any type known in the art. One drip pipe is deployed in each of the water flow troughs 4 and 6. Each of the water flow troughs 4 and 6 is configured such that the bottom surface 20 of the water flow troughs 4 and 6 has a high point 22 located between each of the output channels 14 and a low point 24 corresponding to each of the output channels 14. Therefore, any water dripping from the drip pipe into the water flow troughs 4 and 6 between any two high points 22 is directed to the low point 24, and thus the output channel 14 located between the same two high points 22. With such a configuration, the spacing of the drip holes in the drip pipe is unimportant, and the same drip pipe may be used with various configurations of the water distribution element of the present invention.

The second preferred embodiment of the first variation of the water distribution element of the present invention as illustrated in FIGS. 2-5 is generally referred to herein as 100. The structure of this embodiment is very similar to the embodiment of FIG. 1 and therefore corresponding elements are similarly numbered by increasing the reference numeral by 100, therefore, the central ridge is referred to in FIG. 1 as 8 and in FIGS. 2-4 as 108.

The embodiment of FIGS. 2-5 includes a coincidental-moisture collection structure that includes the downwardly sloping surfaces 110 and 112 and the raised lip 162 configured on the peripheral edge 160 of the downwardly sloping surfaces 110 and 112. The raised lip 162 is configured to trap any coincidental-moisture, such as, but not limited to, dew and rain that falls or condenses on the downwardly sloping surfaces 110 and 112, and direct the coincidental-moisture along coincidental-moisture trough 164 toward one of the delivery point openings 166 of the output channels 114.

A further, optional, coincidental-moisture collection structure for this embodiment is illustrated in FIG. 4. Both coincidental-moisture collection elements 170 and 172 are configured with inwardly sloping surfaces and are deployed so as to extend beyond the adjacent row of crop plants and direct any collected coincidental-moisture toward the plants in the row. These collection elements may be deployed, for example, so as to direct the coincidental-moisture against the outer edge of the raised lip 162, as is coincidental-moisture collection element 170. An alternative deployment, as illustrated by coincidental-moisture collection element 172, directs the coincidental-moisture over the raised lip 162 and into coincidental-moisture trough 164 in order to be directed to one of the delivery point openings 166.

Figure 6:
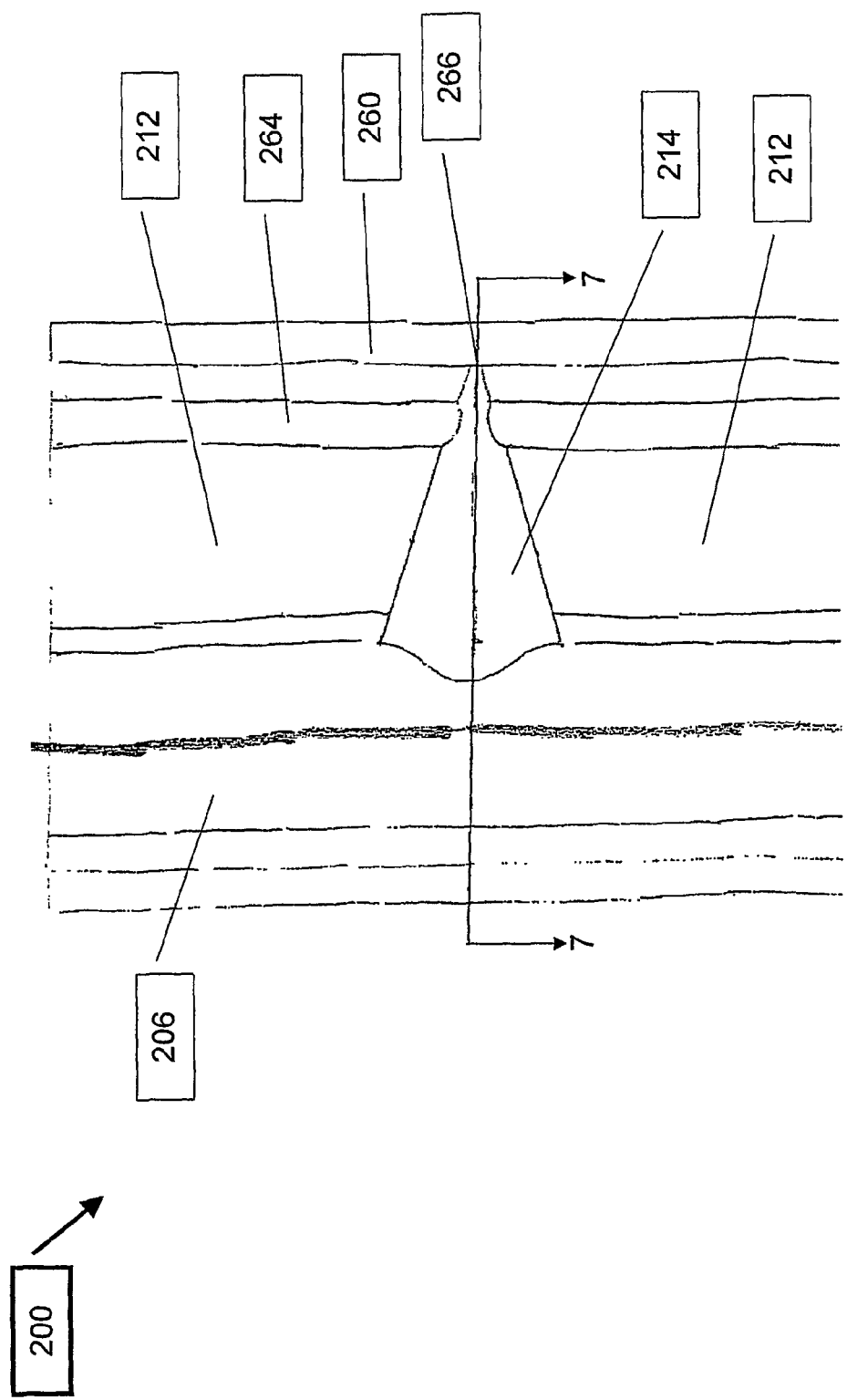
FIG. 6 is a top elevation of a length of a third preferred embodiment of a first variation of an irrigation system element constructed and operative according to the teachings of the present invention.
Figure 7:
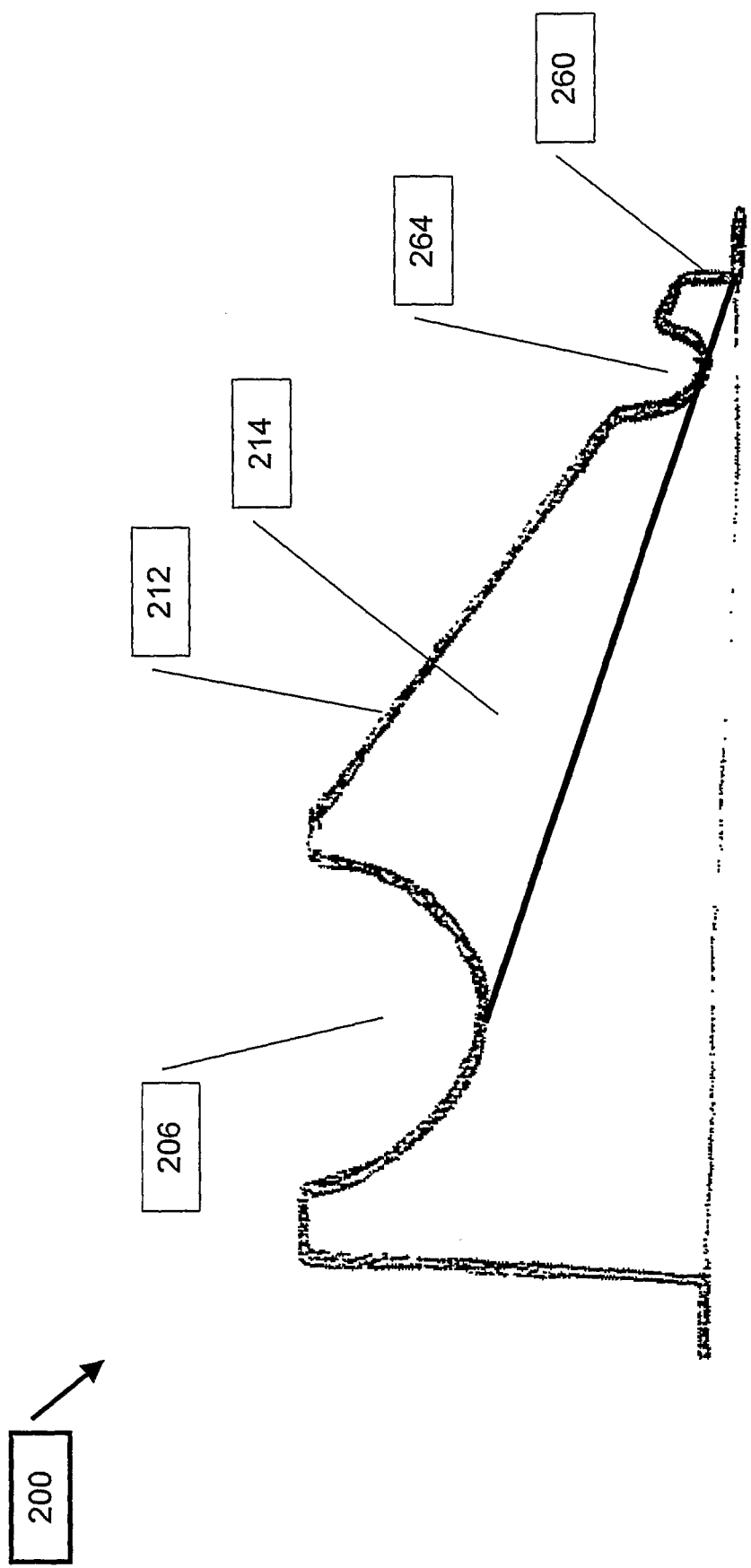
FIG. 7 is a cross-sectional view of the embodiment of FIG. 6 taken along section line 7-7.

The embodiment of FIGS. 6 and 7 is configured so as to supply water to a single row of plants. Therefore, water distribution element 200 is configured with one water flow trough 206 from which extend a plurality of output channels 214 (although only one output channel is illustrated) that direct water to delivery point openings 266 configured in the peripheral edge 260 of the water distribution element 200. This embodiment also illustrates an alternative coincidental-moisture collection structure configuration. As seen here, the downwardly sloping surface 212 includes a recessed coincidental-moisture trough 264 that directs coincidental-moisture toward one of the plurality of output channels 214.

FIGS. 8 and 9 illustrate a preferred embodiment of a second variation of the water distribution element of the present invention in which the water distribution element is deployed over the row of plants. In this embodiment, water distribution element 300 is configured with a plurality of water direction elements 310 that are configured as an interconnected series of downwardly sloping funnels. An aperture 320 of each funnel provides an opening through which a plant emerges. The drip irrigation conduit 330 is supported by a support element 340 and by the conduit support notch 352 configured in the ridge 350 that separates each of the funnel shaped water direction elements 310. Thusly configured, any water emitted from the drip irrigation conduit 330 and substantially any coincidental-moisture that falls onto one of the funnel shaped water direction elements 310 is directed to its aperture 320, and thereby to the plant growing therein.

FIGS. 10 and 11 illustrate a preferred embodiment of a third variation of the water distribution element of the present invention that is deployed substantially as a groundcover 400 having a plurality of openings 490 to provide growing space for the individual crop plants. The non-limiting example of a groundcover 400 illustrated herein is configured with three spaced apart rows of open plant areas 490, each row is separated from an adjacent row by a water flow trough 404 that supports a drip irrigation conduit 492. A plurality of downwardly sloping output channels 414 extend laterally from the water flow troughs 404. The groundcover 400 is configured with a plurality of sloping surfaces 480a and 480b configured to direct water from the output channels 414 to the plurality of open plant areas 490. The groundcover 400 also includes coincidental-moisture collection structures such as the downwardly sloping surfaces 410 and 412, and coincidental-moisture collection elements 470, which extend beyond the outer ones of the three spaced apart rows of open plant areas 490. Surfaces 410, 412 and 470 are configured to direct coincidental-moisture toward sloping surfaces 480a and 480b and/or open plant areas 490.

Figure 12:
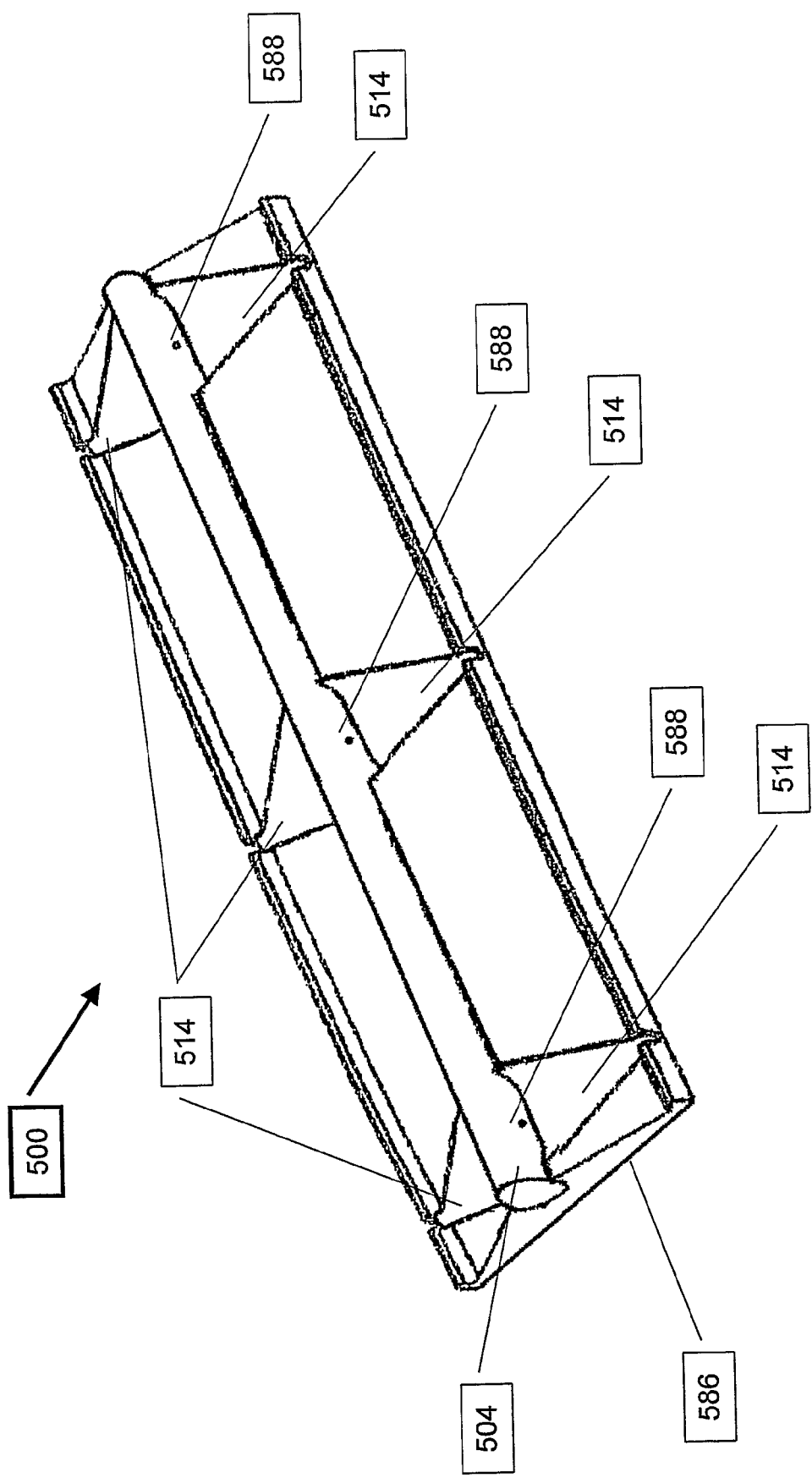
FIG. 12 is an isometric view of the embodiment of FIG. 2 in which the drip irrigation conduit is integrally formed with the base of the water distribution element.

As mentioned above, substantially any embodiment of the water distribution element of the present invention may be configured with an integrally formed drip irrigation conduit, thereby foregoing the need for the additional costs and labor required to deploy a separate drip irrigation conduit after the water distribution element is deployed. As a non-limiting example, FIG. 12 illustrates a preferred embodiment of a water distribution element 500 of the present invention similar to the embodiment of FIG. 2 in which the water flow troughs 104 and 106 have been replaced by drip irrigation conduit 504 that is integrally formed with the base 586 of the water distribution element 500. Drip irrigation nozzles 588 are provided in the drip irrigation conduit 504 corresponding to each of the output channels 514.

It will be readily appreciated that the water distribution element of the present invention may be provided as an element configured for interconnection with other similar elements such that a single row of the water distribution will be made up of a plurality of the water distribution elements of the present invention. Alternately, the water distribution element may be configured as a substantially continuous element that may be rolled up for storage and transportation and unrolled for deployment in the field. In such a configuration, a single row of the water distribution will be made up of a single length of the water distribution element.

It will be appreciated that the above descriptions are intended only to serve as examples and that many other embodiments are possible within the spirit and the scope of the present invention.

What is claimed is:

1. An irrigation device for use with a drip irrigation conduit for providing water to individual plants planted in rows, the irrigation device comprising a water distribution element configured with at least one support configuration for supporting the drip irrigation conduit, and a plurality of water direction elements, wherein water emitted by the drip irrigation conduit is collected by said water distribution element and each of said plurality of water direction elements directs said water to a different delivery point; wherein said water distribution element is configured for deployment between the rows of plants and a coincidental-moisture collection structure is configured as at least one downwardly sloping surface extending outwardly from said support configuration and said at least one downwardly sloping surface is configured with a raised lip on a peripheral edge of said downwardly sloping surface.

2. The irrigation device of claim 1, further including a coincidental-moisture collection structure.

3. The irrigation device of claim 1, wherein said at least one support configuration for supporting the drip irrigation conduit is configured substantially as a water flow trough and said plurality of water direction elements is configured as a plurality of downwardly sloping output channels extending laterally from said water flow trough, and a bottom surface of said water flow trough is configured with a plurality of high points such that one of said plurality of high points is located between each of said plurality of output channels, and said bottom surface of said water flow trough is configured with a plurality of low points, each corresponding to one of said output channels such that any water dispensed into said water flow trough between any two said high points will be directed to one of said low points, and thus one of said output channels, located between said two high points.

4. The irrigation device of claim 1, wherein said at least one downwardly sloping surface is configured with moisture collection trough adjacent to a peripheral edge of said downwardly sloping surface.

5. The irrigation device of claim 1, further including at least one upwardly sloping surface extending outwardly from said peripheral edge of said downwardly sloping surface such that moisture collected on said upwardly sloping surface is directed toward said peripheral edge of said downwardly sloping surface.

6. The irrigation device of claim 1, wherein said water distribution element configured with drip irrigation conduit integrally formed with said water distribution element.

7. An irrigation device for use with a drip irrigation conduit for providing water to individual plants planted in rows, the irrigation device comprising a water distribution element configured with at least one support configuration for supporting the drip irrigation conduit, and a plurality of water direction elements, wherein water emitted by the drip irrigation conduit is collected by said water distribution element and each of said plurality of water direction elements directs said water to a different delivery point wherein said water distribution element is configured for deployment over at least one row of plants and said plurality of water direction elements are configured as an interconnected series of downwardly sloping funnels, an aperture of each funnel providing an opening through which one of the plants emerges.

8. An irrigation device for use with a drip irrigation conduit for providing water to individual plants planted in rows, the irrigation device comprising a water distribution element configured with at least one support configuration for supporting the drip irrigation conduit, and a plurality of water direction elements, wherein water emitted by the drip irrigation conduit is collected by said water distribution element and each of said plurality of water direction elements directs said water to a different delivery point, wherein said water distribution element is configured substantially as a groundcover having a plurality of openings to provide growing space for the individual plants, and said at least one support configuration for supporting the drip irrigation conduit is configured substantially as a water flow trough and said plurality of water direction elements is configured as a plurality of downwardly sloping output channels extending laterally from said water flow trough, and said groundcover is configured with a plurality of sloping surfaces configured to direct water from said output channels to a plurality of open plant areas configured in said groundcover so as to provide growing space for the individual plants and said groundcover extends beyond outer ones of three spaced apart rows of open plant areas so as to include an inwardly sloping coincidental-moisture collection surface configured to direct coincidental-moisture toward said open plant areas.

* * * * *